(12) United States Patent
Matsugi (10) Patent No.: US 9,372,007 B2
(45) Date of Patent: Jun. 21, 2016

(54) AIR CONDITIONING SYSTEM

(71) Applicant: DAIKIN INDUSTRIES, LTD., Osaka-shi, Osaka (JP)

(72) Inventor: Yoshitaka Matsugi, Sakai (JP)

(73) Assignee: DAIKIN INDUSTRIES, LTD., Osaka-Shi (JP)

( * ) Notice: Subject to any disclaimer, the term of this patent is extended or adjusted under 35 U.S.C. 154(b) by 0 days.

(21) Appl. No.: 14/650,653

(22) PCT Filed: Dec. 18, 2013

(86) PCT No.: PCT/JP2013/083966
§ 371 (c)(1),
(2) Date: Jun. 9, 2015

(87) PCT Pub. No.: WO2014/109193
PCT Pub. Date: Jul. 17, 2014

(65) Prior Publication Data
US 2015/0316276 A1 Nov. 5, 2015

(30) Foreign Application Priority Data
Jan. 10, 2013 (JP) .................. 2013-002535

(51) Int. Cl.
*F24F 5/00* (2006.01)
*F24F 11/00* (2006.01)
*F24F 1/00* (2011.01)
*F24F 12/00* (2006.01)

(52) U.S. Cl.
CPC .............. *F24F 5/001* (2013.01); *F24F 1/0007* (2013.01); *F24F 11/0001* (2013.01); *F24F 11/006* (2013.01); *F24F 12/006* (2013.01); *F24F 2011/0064* (2013.01); *Y02B 30/563* (2013.01)

(58) Field of Classification Search
CPC ..... F24F 1/0007; F24F 5/001; F24F 11/0001; F24F 11/006; F24F 12/006; F24F 2011/0064; Y02B 30/563
USPC .......................................... 236/49.3; 454/239
See application file for complete search history.

(56) References Cited

U.S. PATENT DOCUMENTS

2009/0001179 A1* 1/2009 Dempsey ............ F24F 11/0001
236/49.3
2012/0083196 A1* 4/2012 Mockridge ......... F24F 11/0001
454/184

FOREIGN PATENT DOCUMENTS

JP 8-178396 A 7/1996
JP 9-178243 A 7/1997
(Continued)

*Primary Examiner* — Marc Norman
(74) *Attorney, Agent, or Firm* — Birch, Stewart, Kolasch & Birch, LLP (57) ABSTRACT

When the air conditioner implements the temperature controlling operation, the ventilator performs ventilation in a normal ventilation mode where a ventilation amount is set at a certain ventilation amount or more. When the air conditioner implements the operation not intended for temperature control, the ventilator performs ventilation in a ventilation suppressed mode where the number of rotations of an exhaust fan is made greater than that of an air supply fan to place indoor space in a negative pressure and ventilation is performed at an amount smaller than the certain ventilation amount or ventilation is stopped. In the ventilation suppressed mode, a ventilation amount is set to be smaller in response to a greater heating load that is increased by ventilation performed during the operation not intended for temperature control.

7 Claims, 6 Drawing Sheets

(56) References Cited

FOREIGN PATENT DOCUMENTS

| JP | 2626278 | B2 | 7/1997 |
| JP | 3033107 | B2 | 4/2000 |
| JP | 2001-304645 | A | 10/2001 |

* cited by examiner

| WAY OF OPERATION OF AIR CONDITIONER | WAY OF OPERATION OF VENTILATOR | | |
|---|---|---|---|
| | OPERATION MODE | VENTILATION MODE | VENTILATION SUPPRESSED PERIOD |
| — | NORMAL VENTILATION MODE | SET VENTILATION AMOUNT (MODE) BASED ON NORMAL MAP | — |
| TEMPERATURE CONTROLLING OPERATION | | | |
| PRELIMINARY OPERATION | VENTILATION SUPPRESSED MODE | N MODE | PERIOD OF IMPLEMENTATION OF PRELIMINARY OPERATION PERIOD FROM POINT IN TIME AFTER COMPLETION OF PRELIMINARY OPERATION TO WHEN SET TIME tx HAS ELAPSED |
| HEATING THERMOSTAT OFF OPERATION | | LL MODE | PERIOD OF IMPLEMENTATION OF HEATING THERMOSTAT OFF OPERATION |
| DEFROSTING OPERATION | | N MODE | PERIOD OF IMPLEMENTATION OF DEFROSTING OPERATION PERIOD FROM POINT IN TIME AFTER COMPLETION OF DEFROSTING OPERATION TO WHEN SET TIME ty HAS ELAPSED |
| OIL RECOVERING OPERATION | | N MODE | PERIOD OF IMPLEMENTATION OF OIL RECOVERING OPERATION PERIOD FROM POINT IN TIME AFTER COMPLETION OF OIL RECOVERING OPERATION TO WHEN SET TIME tz HAS ELAPSED |

AIR CONDITIONING SYSTEM

FIELD OF THE INVENTION

This invention relates to an air conditioning system including an air conditioner and a ventilator to operate in an interlocking manner.

BACKGROUND OF THE INVENTION

A known technique relating to an air conditioning system including an air conditioner and a ventilator to operate in an interlocking manner is described in Patent Document 1, for example.

According to this technique, the ventilator performs ventilation while the air conditioner implements heating operation. The ventilator exceptionally stops ventilation during defrosting operation if the air conditioner implements defrosting operation during the heating operation. Specifically, implementing the defrosting operation practically means implementing cooling operation to reduce a room temperature. Performing ventilation in this circumstance cools indoor air further to increase a heating load on the air conditioner that is imposed after the defrosting operation. As a result, indoor space is not heated efficiently after the defrosting operation, and it takes a long time for the indoor space to reach a set temperature. For this reason, the ventilator stops ventilation during the defrosting operation.

However, during heating operation, the air conditioner may implement an operation of practically cooling the indoor air or an operation of not heating indoor air as well as the defrosting operation. Examples of such operations not intended for temperature control include an oil recovering operation of recovering a lubricant and a heating thermostat off operation implemented by turning a thermostat off. However, simply stopping ventilation in these operations as well as in the defrosting operation is assumed to cause insufficient ventilation of indoor space.

PRIOR ART DOCUMENTS

Patent Documents

Patent Document 1: Japanese Patent Application Laid-Open No. 8-178396

SUMMARY OF THE INVENTION

It is an object of this invention to provide an air conditioning system capable of ventilating indoor air while suppressing an increase in a load on an air conditioner that is imposed during heating operation.

To solve the aforementioned problem, this invention according to one aspect provides an air conditioning system including an air conditioner (1) to implement at a least heating operation, and a ventilator (2) including an exhaust fan (32) to exhaust indoor air, an air supply fan (31) to introduce outdoor air, and a total heat exchanger to exchange heat between the indoor air and the outdoor air. During heating operation, the air conditioner (1) implements temperature controlling operation to control a room temperature and at least one type of operation not intended for temperature control that is not to control the room temperature. The operation not intended for temperature control generates a heating load. When the air conditioner (1) implements the temperature controlling operation, the ventilator (2) performs ventilation in a normal ventilation mode where a ventilation amount is set at a certain ventilation amount or more. When the air conditioner (1) implements the operation not intended for temperature control, the ventilator (2) performs ventilation in a ventilation suppressed mode where the number of rotations of the exhaust fan (32) is made greater than that of the air supply fan (31) to place indoor space in a negative pressure and ventilation is performed at an amount smaller than the certain ventilation amount or is stopped. In the ventilation suppressed mode, the amount of ventilation by the ventilator is set to be smaller in response to a greater heating load that is increased by ventilation performed during the operation not intended for temperature control.

According to this structure, when the air conditioner implements the operation not intended for temperature control, the number of rotations of the exhaust fan is made greater than that of the air supply fan to place the indoor space in a negative pressure. This permits in-flow of air through a part other than the ventilator. Further, a ventilation amount in the ventilation suppressed mode is made smaller than the certain ventilation amount in the normal ventilation mode. This reduces the amount of heat to be exhausted from the indoor space, compared to a heat amount in the normal ventilation mode. In these ways, increase in a heating load on the air conditioner imposed during the operation not intended for temperature control can be suppressed while the indoor space is ventilated.

In the aforementioned air conditioning system, in the ventilation suppressed mode, it is preferable that a period of ventilation in the ventilation suppressed mode to be performed after completion of the operation not intended for temperature control is set to be longer in response to a greater heating load resulting from the ventilation performed after completion of the operation not intended for temperature control.

This is intended to suppress a delay in heating due to an excessively large heating load resulting from ventilation in the normal ventilation mode performed immediately after completion of the operation not intended for temperature control. This structure allows suppression of an increase in a heating load on the air conditioner that is imposed after completion of the operation not intended for temperature control, compared to ventilation performed in the normal ventilation mode immediately after completion of the operation not intended for temperature control.

In the aforementioned air conditioning system, it is preferable that the ventilator (2) or the air conditioner (1) include a carbon dioxide sensor (35). If a carbon dioxide concentration sensed by the carbon dioxide sensor (35) is higher than a set concentration, it is preferable that the ventilator (2) increases the ventilation amount in response to the carbon dioxide concentration regardless of whether the air conditioner (1) is implementing the temperature controlling operation or the operation not intended for temperature control.

According to this structure, regardless of whether operation of the air conditioner is the temperature controlling operation or the operation not intended for temperature control, the ventilator increases a ventilation amount in response to an indoor carbon dioxide concentration when the indoor carbon dioxide concentration is the same as the set concentration or more. This allows suppression of excessive increase in the carbon dioxide concentration.

In the aforementioned air conditioning system, it is preferable that the operation not intended for temperature control includes at least one preliminary operation to be implemented when the heating operation is started, a heating thermostat off operation that stops a compressor of the air conditioner (1) if a room temperature becomes higher than an upper limit of a set temperature, a defrosting operation to make a refrigerant circuit of the air conditioner (1) run as a cooling cycle, and an oil recovering operation for recovering a lubricant of the compressor by making the refrigerant circuit of the air conditioner (1) run as the cooling cycle.

This structure allows suppression of an increase to a heating load on the air conditioner while ventilating indoor space during operations such as the preliminary operation, the heating thermostat off operation, the defrosting operation, or the oil recovering operation.

In the aforementioned air conditioning system, it is preferable that the operation not intended for temperature control includes at least a heating thermostat off operation to stop a compressor of the air conditioner (1) if a room temperature becomes higher than an upper limit of a set temperature and a defrosting operation to make a refrigerant circuit of the air conditioner (1) run as a cooling cycle. It is preferable that a ventilation amount in the heating thermostat off operation is greater than that in the defrosting operation.

The defrosting operation is practically the same as a cooling operation. Thus, implementing the defrosting operation reduces a room temperature. Performing ventilation during the defrosting operation reduces the room temperature further, thereby increasing a heating load on the air conditioner that is imposed after the defrosting operation. Meanwhile, the heating thermostat off operation is in control of stopping the temperature controlling operation. Thus, the heating thermostat off operation does not reduce the room temperature largely. Performing ventilation during the heating thermostat off operation might reduce the room temperature excessively. However, performing ventilation properly during the heating thermostat off operation allows the room temperature to approximate a set temperature.

As described above, the effect achieved by ventilation during the defrosting operation differs from the effect achieved by ventilation during the heating thermostat off operation. In this regard, a ventilation amount in the heating thermostat off operation is set to be greater than that in the defrosting operation. This structure allows ventilation of a greater amount during the heating thermostat off operation than a ventilation amount during the heating thermostat off operation that is set to be substantially the same as a ventilation amount during the defrosting operation. Further, the room temperature is able to approximate the set temperature promptly.

In the aforementioned air conditioning system, it is preferable that the operation not intended for temperature control includes at least a heating thermostat off operation to stop a compressor of the air conditioner (1) when a room temperature becomes higher than an upper limit of a set temperature and an oil recovering operation for recovering a lubricant of the compressor by making a refrigerant circuit of the air conditioner (1) run as a cooling cycle. It is preferable that a ventilation amount in the heating thermostat off operation is greater than that in the oil recovering operation.

The oil recovering operation is practically the same as the cooling operation. Thus, implementing the oil recovering operation reduces a room temperature. Performing ventilation during the oil recovering operation reduces the room temperature further, thereby increasing a heating load on the air conditioner that is imposed after the oil recovering operation. Meanwhile, the heating thermostat off operation does not reduce the room temperature largely.

As described above, the effect achieved by ventilation during the oil recovering operation differs from the effect achieved by ventilation during the heating thermostat off operation. In this regard, a ventilation amount in the heating thermostat off operation is set to be greater than that in the oil recovering operation. This structure allows ventilation of a greater amount during the heating thermostat off operation than a ventilation amount during the heating thermostat off operation that is set to be substantially the same as a ventilation amount during the oil recovering operation. Further, the room temperature is able to approximate a set temperature promptly.

In the aforementioned air conditioning system, it is preferable that the operation not intended for temperature control includes at least a defrosting operation to make a refrigerant circuit of the air conditioner (1) run as a cooling cycle. When the air conditioner (1) implements the defrosting operation, it is preferable that the ventilator (2) performs ventilation in the ventilation suppressed mode over a period spanning from the start of the defrosting operation to when a set time has elapsed after completion of the defrosting operation.

The defrosting operation is practically the same as the cooling operation in that implementing the defrosting operation reduces a room temperature. Further, performing ventilation in the normal ventilation mode immediately after completion of the defrosting operation reduces the room temperature further, thereby causing the risk of an excessively large heating load to be imposed thereafter on the air conditioner. In response, ventilation is performed in the ventilation suppressed mode over a period spanning from a time point after completion of the defrosting operation to when the set time has elapsed. This can reduce a heating load being imposed after the defrosting operation.

DETAILED DESCRIPTION OF THE PREFERRED EMBODIMENTS

An embodiment embodying an air conditioning system of this invention is described by referring to FIGS. 1 to 6.

Figure 1:
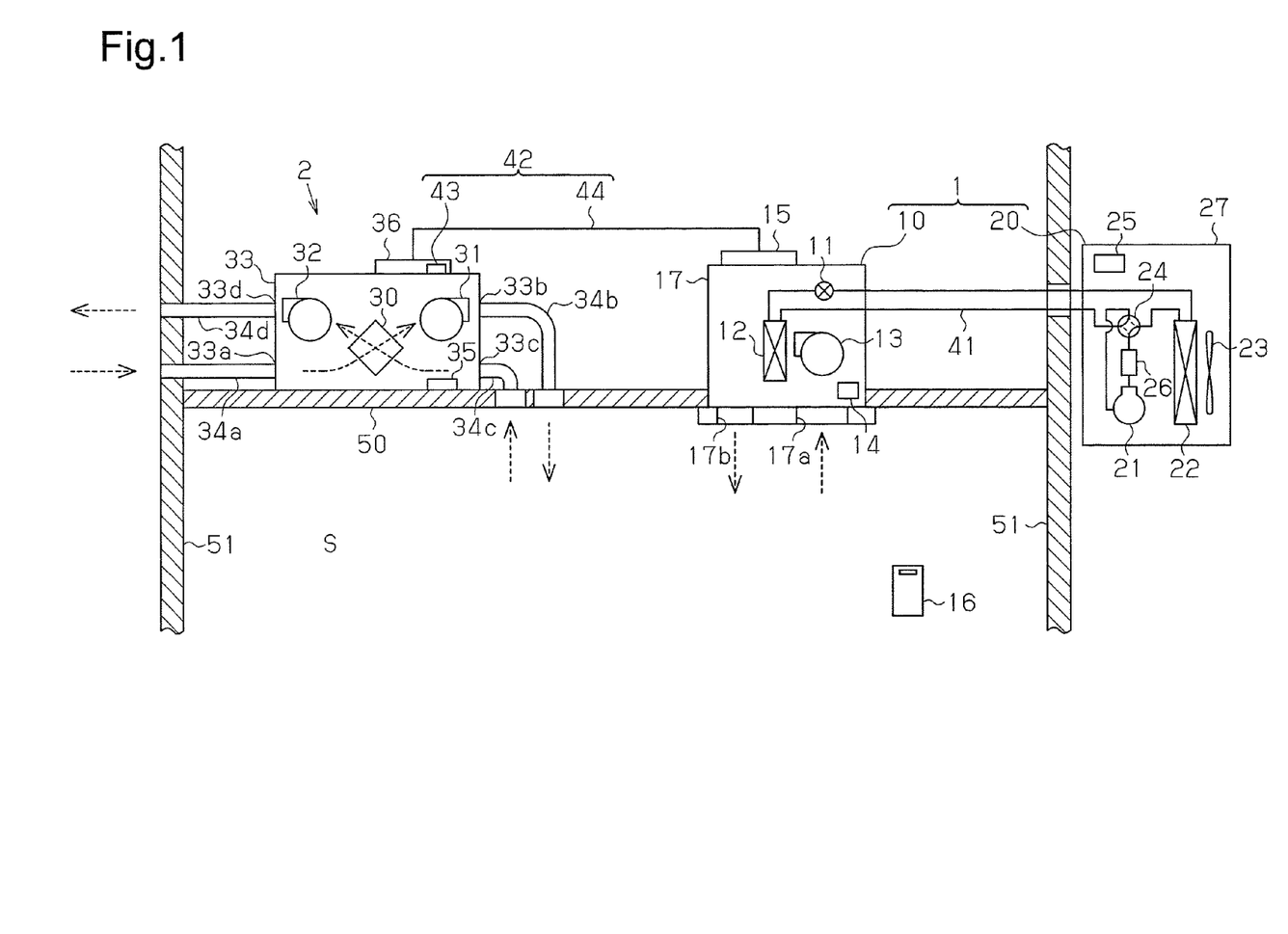
FIG. 1 is a schematic view showing an overall structure of an air conditioning system of this invention.

As shown in FIG. 1, the air conditioning system includes an air conditioner 1 and a ventilator 2. The air conditioner 1 and the ventilator 2 are arranged in a room with a region S separated by a side wall 51 and a ceiling wall 50. The air conditioner 1 is to control the temperature of the region S. The ventilator 2 is to ventilate the region S. In the following description, the region S is called "indoor space" and air inside the region S is called "indoor air."

The air conditioner 1 includes an indoor unit 10 and an outdoor unit 20. The indoor unit 10 includes an expansion valve 11 for expansion of a refrigerant, an indoor heat exchanger 12, an indoor fan 13, an indoor unit controller 15, and a housing 17 with an inlet 17a and an outlet 17b. A temperature sensor 14 for measurement of a room temperature is arranged near the inlet 17a for the indoor fan 13. The indoor unit controller 15 controls the expansion valve 11 and the indoor fan 13 based on a set temperature set with a remote controller 16. The indoor unit controller 15 transmits information about various types of operations implemented by the air conditioner 1 to the ventilator 2. Examples of the various types of operations implemented by the air conditioner 1 include a heating operation, a cooling operation, an air blowing operation, a preliminary operation, an oil recovering operation, a heating thermostat off operation, and a defrosting operation.

The outdoor unit 20 includes a compressor 21 to compress the refrigerant, an outdoor heat exchanger 22, an outdoor fan 23, a four-way valve 24, an outdoor unit controller 25 to control the compressor 21, and an oil separator 26 to separate a lubricant in the refrigerant. These units 21 to 26 are accommodated in a housing 27. The expansion valve 11, the indoor heat exchanger 12, the four-wave valve 24, the compressor 21, the oil separator 26, and the outdoor heat exchanger 22 are each connected to each other through a refrigerant pipe 41 to form a single refrigerant circuit.

The air conditioner 1 implements a cooling operation, an air blowing operation, and a heating operation. During the cooling operation, the indoor heat exchanger 12 functions as an evaporator and the outdoor heat exchanger 22 functions as a condenser. More specifically, the outdoor unit controller 25 selects the position of a valve element of the four-way valve 24 such that the refrigerant circulates while passing through the compressor 21, the outdoor heat exchanger 22, the expansion valve 11, and the indoor heat exchanger 12 in that order. Solid lines of FIG. 1 show how the pipe is connected after this selection.

During the air blowing operation, the indoor unit controller 15 controls the operation of the indoor fan 13 while the outdoor unit controller 25 stops the respective operations of the compressor 21 and the outdoor fan 23. During the heating operation, the indoor heat exchanger 12 functions as a condenser and the outdoor heat exchanger 22 functions as an evaporator. More specifically, the outdoor unit controller 25 selects the position of the valve element of the four-way valve 24 such that the refrigerant circulates while passing through the compressor 21, the indoor heat exchanger 12, the expansion valve 11, and the outdoor heat exchanger 22 in that order. Dashed lines of FIG. 1 show how the pipe is connected after this selection.

Operations implemented during the heating operation include a temperature controlling operation for controlling a room temperature and various types of operations not intended for temperature control and not for controlling the room temperature. During the temperature controlling operation, indoor air is heated such that the room temperature approximates a set temperature. During the temperature controlling operation, a refrigerant flow rate is controlled by changing the opening of the expansion valve 11. Further, heating performance is controlled by changing the number of rotations of the compressor 21. The operation not intended for temperature control is implemented not to control the room temperature but to provide an efficiency and comfortable heating operation. The operations not intended for temperature control include preliminary operations, oil recovering operations, heating thermostat off operations, and defrosting operations. These operations not intended for temperature control practically generate a heating load.

The preliminary operation is a designated operation to be implemented when heating operation is started. A refrigerant temperature is low when the heating operation is started which means driving the indoor fan 13 at the start of the heating operation feeds cold air through the outlet 17b. This brings a feeling of discomfort to a user. The preliminary operation is implemented to reduce the discomfort. More specifically, during the preliminary operation, the compressor 21 is operated while the operation of the indoor fan 13 continues to be stopped in a period from a time point immediately after commencement of the heating operation to when the refrigerant reaches a given temperature or in a period from the point immediately after commencement of the heating operation to when a given time has elapsed.

The heating thermostat off operation is an operation to stop heating indoor air by turning a thermostat off. More specifically, according to the heating thermostat off operation, when a room temperature reaches an upper limit temperature Tx (thermostat off temperature), the thermostat is turned off to stop the respective operations of the compressor 21 and the outdoor fan 23. The compressor 21 continues to be stopped until the room temperature reaches a lower limit temperature Ty (thermostat on temperature). When the room temperature reaches the lower limit temperature Ty, the operation of the compressor 21 is restarted. The defrosting operation is the operation of removing frost attached to the outdoor heat exchanger 22 during heating operation. For the defrosting operation mentioned herein, an operation system to make the refrigerant circuit run as a cooling cycle is employed.

The oil recovering operation is an operation for recovering a lubricant that has flowed into the refrigerant circuit together with the refrigerant during heating operation. During the oil recovering operation, the refrigerant circuit is made to run in the cooling cycle to recover the lubricant. The lubricant dissolves in a solvent, so that it flows out of the compressor 21 together with the refrigerant. The lubricant is separated from the refrigerant by the oil separator 26 and then recovered. Meanwhile, part of the lubricant stays in the outdoor heat exchanger 22 or the indoor heat exchanger 12. The lubricant is readily separated from the refrigerant at a low temperature, so that it tends to stay in the outdoor heat exchanger 22 during heating operation. Thus, to recover the lubricant still in the outdoor heat exchanger 22, the refrigerant circuit is set at the cooling cycle and the opening of the expansion valve 11 is set to be greater than usual during heating operation. In this way, the outdoor heat exchanger 22 is heated and the lubricant in the outdoor heat exchanger 22 is forced to flow, thereby recovering the lubricant.

The ventilator 2 includes a total heat exchanger 30, an air supply fan 31, an exhaust fan 32, a ventilation controller 36, and a housing 33. The total heat exchanger 30 is to exchange heat between indoor air and outdoor air. The air supply fan 31 is to supply the outdoor air into indoor space. The exhaust fan 32 is to exhaust indoor air. The air supply fan 31, the exhaust fan 32, and the ventilation controller 36 are accommodated in the housing 33. The housing 33 is provided with an outside air inlet 33a, an outside air supply port 33b, an inside air inlet 33c, and an inside air exhaust port 33d. The outdoor air is taken in through the outside air inlet 33a and is fed into the indoor space through the outside air supply port 33b. The indoor air is taken in through the inside air inlet 33c and is fed to outdoor space through the inside air exhaust port 33d. A carbon dioxide sensor 35 is attached near the inside air inlet 33c. The carbon dioxide sensor 35 outputs a signal to the ventilation controller 36 in response to the concentration of the indoor air taken in sensed by the carbon dioxide sensor 35.

The outside air inlet 33a is provided with an outside air inlet pipe 34a through which outdoor air is taken into the housing 33. The outside air supply port 33b is provided with a supply pipe 34b through which the outdoor air is supplied to indoor space. The inside air inlet 33c is provided with an inside air inlet pipe 34c through which indoor air is taken into the housing 33. The inside air exhaust port 33d is provided with an exhaust pipe 34d through which the indoor air is exhausted to outdoor space.

The total heat exchanger 30 is to exchange sensible heat and latent heat between indoor air and outdoor air. The ventilation controller 36 is to control the amount of ventilation by the ventilator 2. The amount of ventilation by the ventilator 2 is controlled at the following five stages.

"H mode," in which a ventilation amount is set at a maximum.

"M mode," in which a ventilation amount is set to be smaller than that in H mode.

"L mode," in which a ventilation amount is set to be smaller than that in M mode.

"LL mode," in which a ventilation amount is set to be smaller than that in L mode.

"N mode," in which a ventilation amount is set to be smaller than that in LL mode.

A ventilation amount in H mode, that in M mode, and that in L mode are greater than a certain ventilation amount X. A ventilation amount in LL mode is the same as the certain ventilation amount X or less. The certain ventilation amount X is determined in advance based on the amount of indoor space, the number of persons a room can accommodate, the amount of carbon dioxide emitted from a person, and the purpose of use of the room, for example. A ventilation amount is variable in LL mode and N mode.

The magnitude of a ventilation amount is determined based on the number of rotations of the exhaust fan 32 and that of the air supply fan 31. The number of rotations of the exhaust fan 32 and that of the air supply fan 31 are set to be smaller than a first reference value in N mode. This mode includes a stop mode where the exhaust fan 32 and the air supply fan 31 do not run. Specifically, a ventilation amount is approximately zero in N mode. The ventilator 2 set in N mode is in a state distinguished from a state where the ventilator 2 is powered off. While the ventilator 2 is in the state of N mode, the exhaust fan 32 and the air supply fan 31 can be activated simultaneously or independently if a given condition is satisfied.

In LL mode, the number of rotations of the exhaust fan 32 is set to be the same as the first reference value or more and to be less than a second reference value, while the number of rotations of the air supply fan 31 is set to be smaller than that of the exhaust fan 32. Specifically, in LL mode, the amount of air to be exhausted from indoor space is greater than the amount of air to be supplied to the indoor space. Thus, according to ventilation performed in LL mode, the indoor space is placed in a negative pressure lower than atmospheric pressure. This control reduces the amount of outdoor air to be supplied through the outside air supply port 33b of the ventilator 2, thereby permitting the flow of air from outside into a room (region S). If the room is adjacent to a corridor, for example, air flows from the corridor into the room. In this case, the air flows into the room through a path other than the ventilator 2, thereby suppressing the retention of indoor air compared to when operation of the ventilator 2 is stopped.

In L mode, the number of rotations of the exhaust fan 32 and that of the air supply fan 31 are set to be the same as the second reference value or more and to be less than a third reference value. In M mode, the number of rotations of the exhaust fan 32 and that of the air supply fan 31 are set to be the same as the third reference value or more and to be less than a fourth reference value. In H mode, the number of rotations of the exhaust fan 32 and that of the air supply fan 31 are set to be the same as the fourth reference value or more. H mode is used to ventilate indoor space forcibly.

The ventilation controller 36 exerts the following control in addition to controlling a ventilation amount. The ventilation controller 36 calculates a carbon dioxide concentration based on a signal from the carbon dioxide sensor 35. Then, the ventilation controller 36 controls a ventilation amount based on the carbon dioxide concentration. Additionally, the ventilation controller 36 controls a ventilation amount based on information about operation of the air conditioner 1 output from the air conditioner 1. As an example, the ventilation controller 36 suppresses a ventilation amount during various types of operations classified as the operation not intended for temperature control.

A communication unit 42 includes a circuit part 43 to control communication and a communication line 44 connecting the indoor unit controller 15 and the ventilation controller 36. The communication unit 42 acquires information about a way of operation of the air conditioner 1 and transmits the information to the ventilator 2. While the communication line 44 is shown as a wired line in FIG. 1, it may alternatively be a wireless line. Heating operation of the air conditioner 1 is started in response to operation of the remote controller 16. During the heating operation, the preliminary operation of the compressor 21 is implemented first. After the preliminary operation is finished, heating is controlled.

Figure 2:
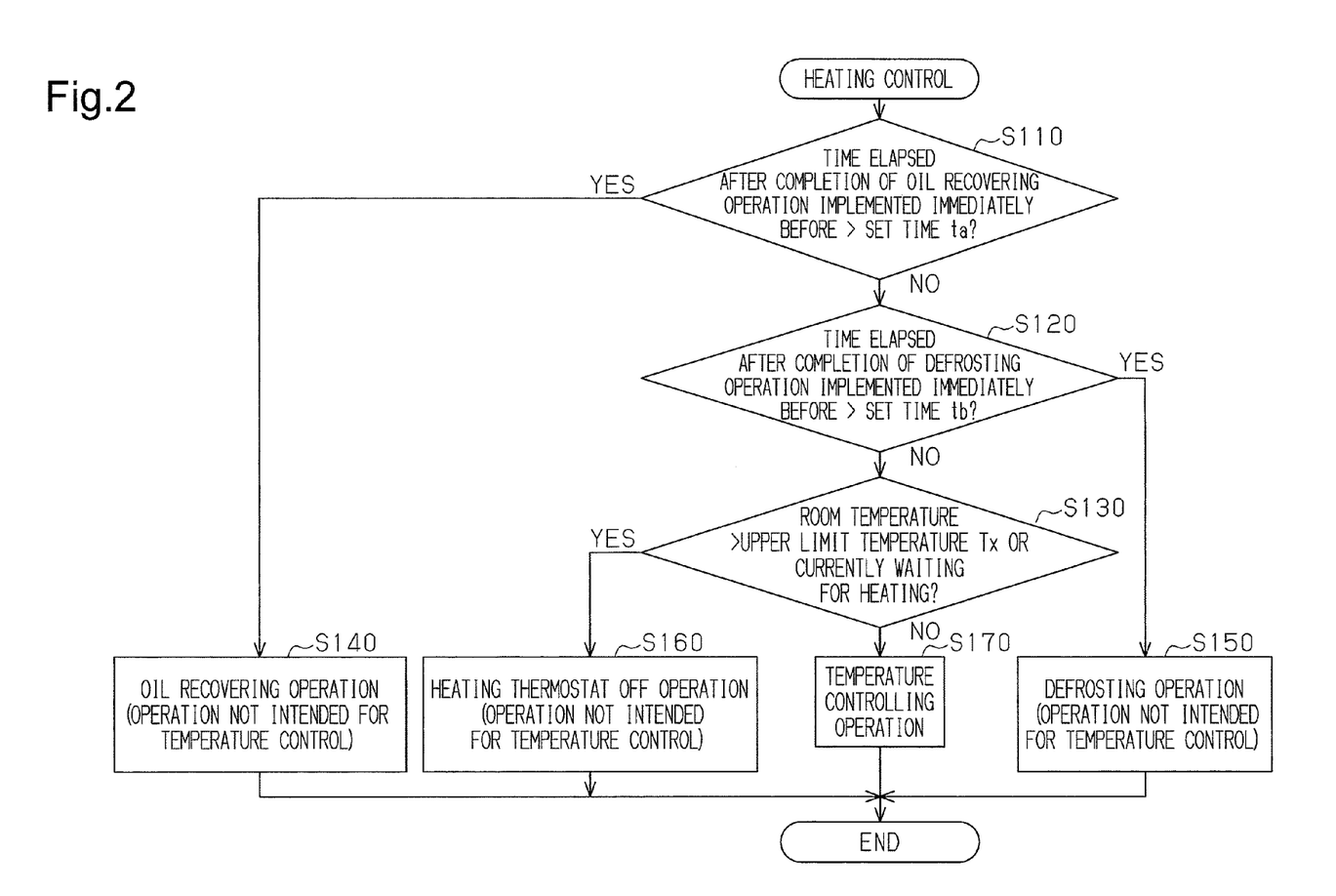
FIG. 2 is a flowchart showing a procedure of controlling heating.

An example of the heating control is described next by referring to FIG. 2.

Operations to be implemented for the heating control include the temperature controlling operation, the oil recovering operation, and the defrosting operation. The oil recovering operation and the defrosting operation are implemented with certain periodicity. If a given condition is satisfied during heating operation, the heating thermostat off operation is implemented. The temperature controlling operation, the oil recovering operation, the defrosting operation, and the heating thermostat off operation are implemented according to the following flow.

In step S110, it is determined whether or not the time elapsed after completion of the oil recovering operation implemented immediately before is longer than a set time ta. If the elapsed time is determined to be longer than the set time ta (YES at S110), the flow proceeds to step S140. The oil recovering operation is implemented in step S140.

If the elapsed time is determined to be the same as the set time to or less in step S110, the flow proceeds to step S120. In step S120, it is determined whether or not a time elapsed after completion of the defrosting operation implemented immediately before is longer than a set time tb. If the elapsed time is determined to be longer than the set time tb (YES at S120), the flow proceeds to step S150. The defrosting operation is implemented in step S150.

If the elapsed time is determined to be the same as the set time tb or less in step S120, the flow proceeds to step S130. In step S130, it is determined whether a room temperature is higher than the upper limit temperature Tx or whether it is currently in a period waiting for heating. If the room temperature is determined to be higher than the upper limit temperature Tx or the current period is determined to be a period waiting for heating (YES at S130), the flow proceeds to step S160 to implement the heating thermostat off operation. At this time, the operation of the compressor 21 is stopped or the compressor 21 continues to be in a stopped state. This reduces heating performance to reduce the room temperature gradually. If the room temperature drops to the lower limit temperature Ty, the operation of the compressor 21 is restarted.

In step S130, if the room temperature is determined to be the same as the upper limit temperature Tx or less and the current period is determined not to be a period waiting for heating (NO at S130), the temperature controlling operation is implemented. As a result, the compressor 21 is controlled to make the room temperature approximate a set temperature.

Figure 3:
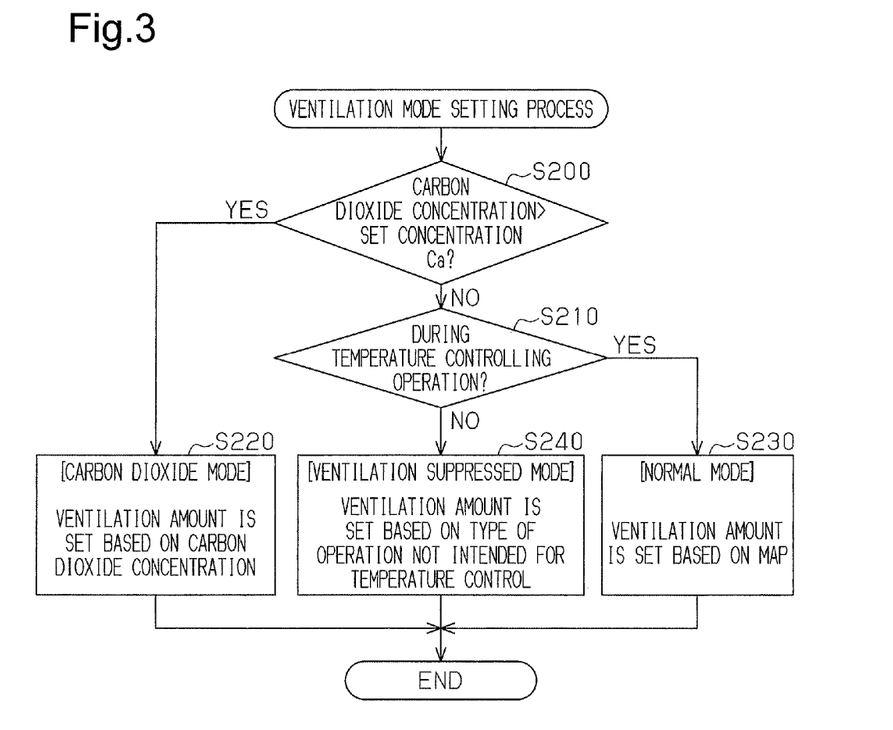
FIG. 3 is a flowchart showing a procedure of a ventilation mode setting process.

"Ventilation mode setting process" implemented by the ventilation controller 36 is described next by referring to FIG. 3. The "ventilation mode setting process" is implemented with certain periodicity. The ventilation mode setting process is to set a way of operation of the ventilator 2 based on a way of operation of the air conditioner 1.

In step S200, the ventilation controller 36 determines whether a carbon dioxide concentration sensed by the carbon dioxide sensor 35 is higher than a set concentration Ca. If the carbon dioxide concentration is determined to be higher than the set concentration Ca (YES at S200), the process proceeds to step S220. In step S220, the ventilation controller 36 makes the air supply fan 31 and the exhaust fan 32 run in a "carbon dioxide mode."

If the carbon dioxide concentration is determined to be the same as the set concentration Ca or less (NO at S220), the ventilation controller 36 makes a determination in step S210.

In step S210, the ventilation controller 36 determines whether the air conditioner 1 is implementing the temperature controlling operation. If the air conditioner 1 is determined to be implementing the temperature controlling operation (YES at S210), the process proceeds to step S230. In step S230, the ventilation controller 36 makes the air supply fan 31 and the exhaust fan 32 run in a "normal ventilation mode."

If the air conditioner 1 is determined not to be implementing the temperature controlling operation but it is determined to be implementing operation other than the temperature controlling operation (NO at S210), the process proceeds to step S240. In step S240, the ventilation controller 36 makes the air supply fan 31 and the exhaust fan 32 run in a "ventilation suppressed mode."

The following describes each mode of the ventilator 2 selected as a result of the aforementioned determinations.

Figure 4:
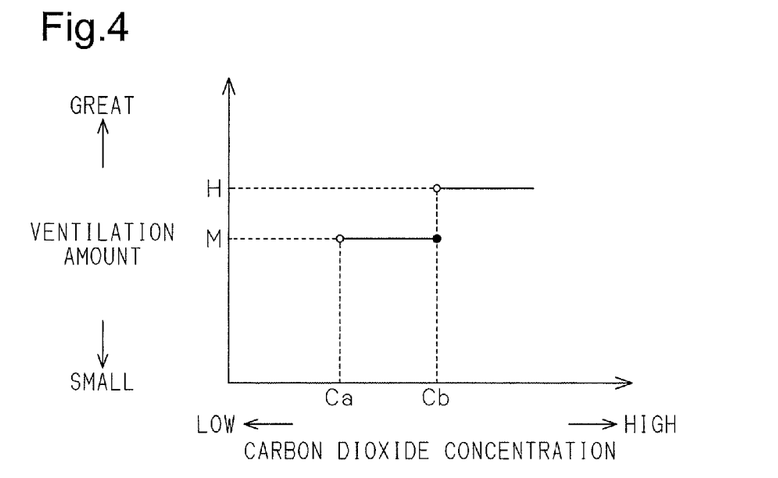
FIG. 4 is a map showing a ventilation amount relative to a carbon dioxide concentration.

In the carbon dioxide mode, the ventilation controller 36 sets a ventilation amount based on a carbon dioxide map as shown in FIG. 4. A carbon dioxide concentration becomes higher in response to the number of persons existing in a room. Thus, a carbon dioxide concentration functions as an index indicating the number of persons in the room. A person becomes a source for dust or odor, so that a greater number of persons in the room results in higher necessity of ventilation. For this reason, a ventilation amount is set in response to a carbon dioxide concentration. The carbon dioxide map is set such that a ventilation amount increases in response to a carbon dioxide concentration. As shown in FIG. 4, a ventilation amount is set in M mode if a carbon dioxide concentration is higher than the set concentration Ca and does not exceed a set concentration Cb. If carbon dioxide concentration is higher than the set concentration Cb, a ventilation amount is set in H mode. The set concentration Cb is higher than the set concentration Ca.

In the normal ventilation mode, the ventilation controller 36 sets a ventilation amount based on a normal map used in the normal ventilation mode. As an example, the normal map includes a cooling map to be used for a cooling operation and a heating map to be used for heating operation. In the normal ventilation mode, a ventilation amount is set to be greater than the certain ventilation amount X. More specifically, a mode of setting a ventilation amount used in the normal ventilation mode includes L mode, M mode, and H mode. Each of these modes is selected based on an air conditioning load on the air conditioner 1.

Figure 5:
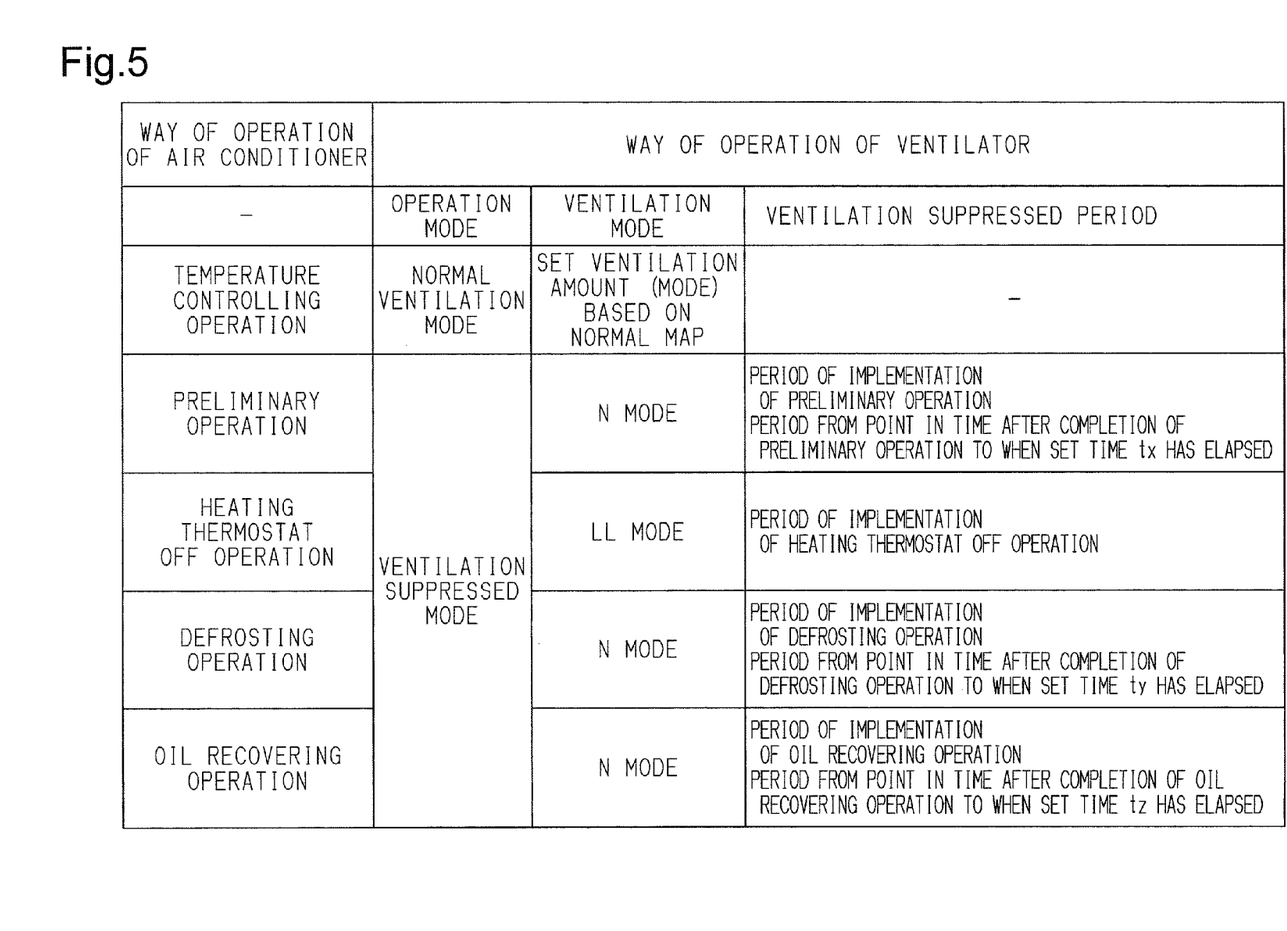
FIG. 5 is a table showing a relationship between a way of operation of an air conditioner and a way of operation of a ventilator.

In the "ventilation suppressed mode," a ventilation amount is set to be smaller than that in the "normal ventilation mode." More specifically, by referring to the table shown in FIG. 5, the ventilation controller 36 sets a ventilation amount and a ventilation suppressed period in response to the type of operation not intended for temperature control.

The following describes a ventilation amount and a ventilation suppressed period in each of the various types of operations not intended for temperature control by referring to FIG. 5.

When the air conditioner 1 implements the "preliminary operation," the ventilation controller 36 sets a ventilation amount in N mode in a period when the preliminary operation is implemented and a period from a time point after completion of the preliminary operation to when a set time tx has elapsed. The ventilation amount is smaller than that in the normal ventilation mode. The ventilation amount is set to be smaller in response to a greater heating load that might be increased by ventilation performed during the preliminary operation. The heating load is assumed based on a difference between a room temperature and an outdoor temperature, for example. The set time tx is set to be longer in response to a greater heating load resulting from ventilation performed after the preliminary operation.

In this case, heating is not implemented during the preliminary operation of the air conditioner 1, so that the outdoor temperature is normally lower than the room temperature. Thus, performing ventilation during the preliminary operation results in the risk of an increase in an air conditioning load (heating load) to be imposed before air conditioning. For this reason, ventilation is suppressed in the period when the air conditioner 1 implements the preliminary operation and the period subsequent to when the set time tx has elapsed.

When the air conditioner 1 implements the "heating thermostat off operation," the ventilation controller 36 sets a ventilation amount in LL mode in a period when the heating thermostat off operation is implemented and makes the air supply fan 31 and the exhaust fan 32 run. The ventilation amount is set to be smaller in response to a greater heating load that might be increased by ventilation performed during the heating thermostat off operation. The heating load is assumed based on a difference between a room temperature and an outdoor temperature, for example.

In this case, heating is not implemented during the heating thermostat off operation of the air conditioner 1. Thus, performing ventilation during the heating thermostat off operation reduces the room temperature steeply to cause the risk of increase in a heating load to occur when heating is restarted. The increase in the heating load hinders stabilization of the room temperature. For this reason, the normal ventilation mode is not preferable for ventilation to be performed during the heating thermostat off operation.

Meanwhile, the room temperature is higher than a set temperature during the heating thermostat off operation. Thus, omitting ventilation completely makes it take longer for the room temperature to drop to the set temperature. This results in the risk of bringing a feeling of discomfort to a user inside the room. In response, during the heating thermostat off operation, the ventilation controller 36 sets a ventilation amount in LL mode and makes the air supply fan 31 and the exhaust fan 32 run. In this case, ventilation is performed by suppressing in-flow of outdoor air while causing air to flow in through a part other than the ventilator 2. This prevents a time required for the room temperature to drop to the set temperature from becoming too long while preventing the room temperature from dropping steeply. Ventilation may be suppressed in a period from a time point after completion of the heating thermostat off operation to when a set time tr has elapsed. The set time tr is set to be longer in response to a greater heating load resulting from ventilation performed after the heating thermostat off operation.

When the air conditioner 1 implements the "defrosting operation," the ventilation controller 36 sets a ventilation amount in N mode in a period when the defrosting operation is implemented and a period from a time point after completion of the defrosting operation to when a set time ty has elapsed. The ventilation amount is smaller than that in the normal ventilation mode. The ventilation amount is set to be smaller in response to a greater heating load that might be increased by ventilation performed during the defrosting operation. The heating load is assumed based on the temperature of the refrigerant in the indoor heat exchanger 12 or a difference between a room temperature and an outdoor temperature during the defrosting operation, for example. The set time ty is set to be longer in response to a greater heating load resulting from ventilation performed after the defrosting operation.

In this case, the refrigerant circuit is set at the cooling cycle during the defrosting operation of the air conditioner 1. At this time, indoor air is cooled as a result of convection of the indoor air while the indoor fan 13 of the air conditioner 1 is stopped. Thus, performing ventilation during the defrosting operation reduces the room temperature to cause the risk of an increase in a heating load to occur when heating is restarted. For this reason, ventilation is suppressed in the period when the air conditioner 1 implements the defrosting operation and the period subsequent to when the set time ty has elapsed.

When the air conditioner 1 implements the "oil recovering operation," the ventilation controller 36 sets a ventilation amount in N mode in a period when the oil recovering operation is implemented and a period from a time point after completion of the oil recovering operation to when a set time tz has elapsed. The ventilation amount is smaller than that in the normal ventilation mode. The ventilation amount is set to be smaller in response to a greater heating load that might be increased by ventilation performed during the oil recovering operation. The heating load caused by the oil recovering operation is assumed based on the temperature of the refrigerant in the indoor heat exchanger 12 or a difference between a room temperature and an outdoor temperature during the oil recovering operation, for example. The set time tz is set to be longer in response to a greater heating load resulting from ventilation performed after the oil recovering operation.

In this case, the refrigerant circuit is set at the cooling cycle during the oil recovering operation of the air conditioner 1. At this time, indoor air is cooled as a result of convection of the indoor air while the indoor fan 13 of the air conditioner 1 stops. Thus, performing ventilation during the oil recovering operation reduces the room temperature further to cause the risk of an increase in a heating load to occur when heating is restarted. For this reason, ventilation is suppressed in the period when the air conditioner 1 implements the oil recovering operation and the period subsequent to when the set time tz has elapsed.

Figure 6:
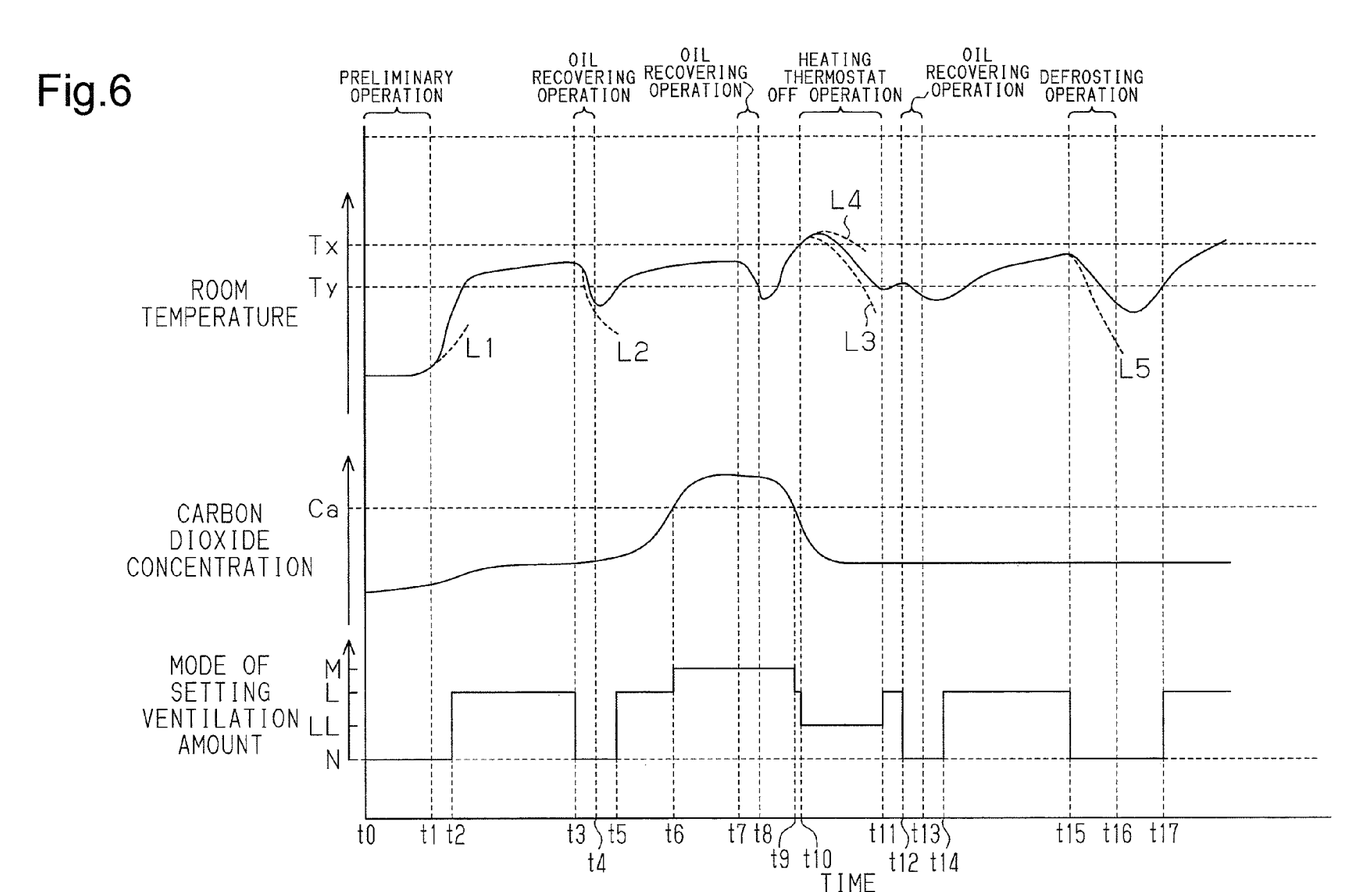
FIG. 6 is a graph showing a relationship among room temperature, carbon dioxide concentration, and ventilation amount.

The following describes how the implementation of the "ventilation mode setting process" works by referring to FIG. 6. FIG. 6 shows how an indoor room temperature and an indoor carbon dioxide concentration change and how a setting mode for a ventilation amount changes.

At a time point t0, heating operation is started in response to operation on the remote controller 16. The air conditioner 1 starts the preliminary operation. At this time, the amount of ventilation by the ventilator 2 is set in N mode.

At a time point t1, the air conditioner 1 stops the preliminary operation and starts the temperature controlling operation. At this time, the amount of ventilation by the ventilator 2 continues to be set in N mode. Ventilation is performed to only a little extent while the air conditioner 1 starts the temperature controlling operation, so that the room temperature increases steeply.

A time point t2 refers to a point when the set time tx has elapsed after the time point t1. The air conditioner 1 implements the temperature controlling operation at the time point t2. At this time, the amount of ventilation by the ventilator 2 is set in L mode. Specifically, ventilation is stated. This increases the room temperature at a lower rate.

At a time point t3, the air conditioner 1 stops the temperature controlling operation and starts the oil recovering operation. At this time, the amount of ventilation by the ventilator 2 is set in N mode. Implementing the oil recovering operation stops the temperature controlling operation. As a result, the room temperature drops.

At a time point t4, the air conditioner 1 finishes the oil recovering operation and starts the temperature controlling operation. At this time, the amount of ventilation by the ventilator 2 continues to be set in N mode. Restarting the temperature controlling operation increases the room temperature.

A time point t5 refers to a point when the set time tz has elapsed after the time point t4. The amount of ventilation by the ventilator 2 is changed from that in N mode and reset in L mode at the time point t5. Specifically, the ventilator 2 restarts ventilation. This increases the room temperature at a lower rate.

At a time point t6, increase in the number of persons existing in a room makes carbon dioxide concentration higher than the set concentration Ca. At this time, the amount of ventilation by the ventilator 2 is set in M mode. Specifically, the ventilation amount increases. This encourages ventilation to purify indoor air.

At a time point t7, the air conditioner 1 starts the oil recovering operation. At this time, carbon dioxide concentration is higher than the set concentration Ca. The process of setting a ventilation mode gives priority to ventilation to be performed based on a carbon dioxide concentration, so that a ventilation amount is set in the carbon dioxide mode. As a result, the amount of ventilation by the ventilator 2 continues to be set in M mode. Implementing the oil recovering operation reduces the room temperature.

At a time point t8, the air conditioner stops the oil recovering operation and starts the temperature controlling operation. At this time, carbon dioxide concentration is higher than the set concentration Ca, so that the amount of ventilation by the ventilator 2 continues to be set in M mode. Restarting the temperature controlling operation increases the room temperature.

At a time point t9, carbon dioxide concentration becomes the same as the set concentration Ca or less. At this time, ventilation is performed in the normal ventilation mode. The amount of ventilation by the ventilator 2 is set in L mode.

At a time point t10, the room temperature exceeds the upper limit temperature Tx. At this time, the thermostat for the compressor 21 of the air conditioner 1 is turned off to stop the operation of the compressor 21. Specifically, the air conditioner 1 implements the heating thermostat off operation. At this time, the amount of ventilation by the ventilator 2 is set in LL mode. As a result, the room temperature increases gradually and then starts to drop.

At a time point t11, the room temperature becomes lower than the lower limit temperature Ty. At this time, the air conditioner 1 restarts the temperature controlling operation. Further, the amount of ventilation by the ventilator 2 is set in L mode.

At a time point t12, the air conditioner 1 stops the temperature controlling operation and starts the oil recovering operation. At this time, the amount of ventilation by the ventilator 2 is set in N mode. Stopping the temperature controlling operation reduces the room temperature.

At a time point t13, the air conditioner 1 finishes the oil recovering operation and starts the temperature controlling operation. At this time, the amount of ventilation by the ventilator 2 continues to be set in N mode. Restarting the temperature controlling operation increases the room temperature.

A time point t14 refers to a time point when the set time tz has elapsed after the time point t13. The amount of ventilation by the ventilator 2 is changed from that in N mode and reset in L mode at the time point t14. Specifically, ventilation is restarted.

At a time point t15, the air conditioner 1 stops the temperature controlling operation and starts the defrosting operation. At this time, the amount of ventilation by the ventilator 2 is set in N mode, Stopping the temperature controlling operation reduces the room temperature.

At a time point t16, the air conditioner 1 finishes the defrosting operation and starts the temperature controlling operation. At this time, the amount of ventilation by the ventilator 2 continues to be set in N mode. Restarting the temperature controlling operation increases the room temperature.

A time point t17 refers to a time point when the set time ty has elapsed after the time point t16. The amount of ventilation by the ventilator 2 is changed from that in N mode and reset in L mode at the time point t17. Specifically, the ventilator 2 restarts ventilation. This increases the room temperature at a lower rate.

The following describes how the ventilation of this embodiment works by referring to FIG. 6.

When ventilation is performed in the normal ventilation mode in a period from the time point t0 to the time point t1 when the preliminary operation is implemented and a period subsequent to when the set time tx has elapsed (period from the time point t1 to the time point t2), the room temperature increases at a lower rate than in the case where ventilation is suppressed as shown by a dashed line L1 of FIG. 6.

If ventilation is performed in the normal ventilation mode in a period from the time point t3 to the time point t4 when the oil recovering operation is implemented and a period subsequent to when a given time has elapsed (period from the time point t4 to the time point t5), the room temperature drops at a higher rate than in the case where ventilation is suppressed as shown in a dashed line L2 of FIG. 6.

If ventilation is performed in L mode in a period from the time point t10 to the time point t11 when the heating thermostat off operation is implemented, change in the room temperature switches from increasing to dropping in a shorter time and the room temperature drops thereafter at a higher rate than in the case of ventilation performed in LL mode as shown by a dashed line L3 of FIG. 6.

If ventilation is performed in N mode in the period from the time point t10 to the time point t11 when the heating thermostat off operation is implemented, the room temperature drops at a lower rate than in the case of ventilation performed in LL mode as shown by a dashed line L4 of FIG. 6.

If ventilation is performed in the normal ventilation mode in a period from the time point t15 to the time point t16 when the defrosting operation is implemented and a period subsequent to when a given time has elapsed (period from the time point t16 to the time point t17), the room temperature drops at a higher rate than in the case where ventilation is suppressed as shown by a dashed line L5 of FIG. 6.

As described above, performing ventilation in the normal ventilation mode during the operation not intended for temperature control such as the preliminary operation, the oil recovering operation, the heating thermostat off operation, or the defrosting operation increases a heating load resulting from the ventilation. In contrast, suppressing ventilation during the operation not intended for temperature control such as the preliminary operation, the oil recovering operation, the heating thermostat off operation, or the defrosting operation as in this embodiment reduces increase in a heating load. Additionally, in this embodiment, ventilation is suppressed further in a period from when each of the preliminary operation, the oil recovering operation, and the defrosting operation is finished to when a given time has elapsed. This suppresses increase in a heating load.

The air conditioning system of this embodiment achieves the following effects:

(1) The air conditioning system includes the air conditioner 1 and the ventilator 2. During heating operation, the air conditioner 1 implements the temperature controlling operation of controlling a room temperature and at least one type of operation not intended for temperature control that is not to control the room temperature. Implementing the operation not intended for temperature control generates a heating load. When the air conditioner 1 implements the temperature controlling operation, the ventilator 2 performs ventilation in the normal ventilation mode where a ventilation amount is set at a certain ventilation amount X or more. In the normal ventilation mode, L mode and a mode higher than L mode are used as modes for setting a ventilation amount. When the air conditioner 1 implements any of the operations not intended for temperature control, the ventilator 2 makes the number of rotations of the exhaust fan 32 greater than that of the air supply fan 31 to place indoor space in a negative pressure and performs ventilation in an amount smaller than the certain ventilation amount X or stops ventilation. Further, in the ventilation suppressed mode, the amount of ventilation by the ventilator 2 is set to be smaller in response to a greater heating load that might be increased by ventilation performed during the operation not intended for temperature control.

According to this structure, when the air conditioner 1 implements the operation not intended for temperature control, the number of rotations of the exhaust fan 32 is made greater than that of the air supply fan 31 to place the indoor space in a negative pressure. This permits in-flow of air through a part other than the ventilator 2. Further, a ventilation amount in the ventilation suppressed mode is smaller than the certain ventilation amount X in the normal ventilation mode. This reduces the amount of heat to be exhausted from the indoor space, compared to a heat amount in the normal ventilation mode. In these ways, increase in a heating load on the air conditioner 1 imposed during the operation not intended for temperature control can be suppressed while the indoor space is ventilated.

In the ventilation suppressed mode, the amount of ventilation by the ventilator 2 is set to be smaller in response to a greater heating load that might be increased by ventilation performed during the operation not intended for temperature control. This permits proper ventilation while suppressing increase in a heating load during the operation not intended for temperature control.

(2) In the ventilation suppressed mode, a period of ventilation in the ventilation suppressed mode to be performed after completion of the operation not intended for temperature control is set to be longer in response to a greater heating load resulting from the ventilation performed after completion of the operation not intended for temperature control. This is intended to suppress a delay in heating due to an excessively large heating load resulting from ventilation in the normal ventilation mode performed immediately after completion of the operation not intended for temperature control. This structure allows suppression of an increase in a heating load on the air conditioner 1 to be imposed after completion of the operation not intended for temperature control, compared to ventilation performed in the normal ventilation mode immediately after completion of the operation not intended for temperature control.

(3) The ventilator 2 includes the carbon dioxide sensor 35. If a carbon dioxide concentration is higher than the set concentration Ca, the ventilator 2 increases a ventilation amount in response to the carbon dioxide concentration regardless of whether the air conditioner 1 is implementing the temperature controlling operation or the operation not intended for temperature control. Specifically, regardless of whether operation of the air conditioner 1 is the temperature controlling operation or the operation not intended for temperature control, the ventilator 2 increases a ventilation amount if an indoor carbon dioxide concentration is high. This allows suppression of an increase in the carbon dioxide concentration.

(4) The air conditioner 1 implements at least one of the preliminary operation, the heating thermostat off operation, the defrosting operation, and the oil recovering operation. The preliminary operation, the heating thermostat off operation, the defrosting operation, and the oil recovering operation are all classified as operations not intended for temperature control. Thus, during these operations, increase in a heating load on the air conditioner can be suppressed while indoor space is ventilated.

(5) A ventilation amount during the heating thermostat off operation is set to be greater than that of the defrosting operation. The defrosting operation is practically the same as a cooling operation. Thus, implementing the defrosting operation reduces a room temperature. Performing ventilation during the defrosting operation reduces the room temperature further, thereby increasing a heating load on the air conditioner 1 to be imposed after the defrosting operation. Meanwhile, the heating thermostat off operation is in control of stopping the temperature controlling operation. Thus, the heating thermostat off operation does not reduce the room temperature largely. Performing ventilation during the heating thermostat off operation might reduce the room temperature excessively. However, performing ventilation properly during the heating thermostat off operation allows the room temperature to approximate a set temperature.

As described above, the effect achieved by ventilation during the defrosting operation differs from the effect achieved by ventilation during the heating thermostat off operation. In this regard, a ventilation amount in the heating thermostat off operation is set to be greater than that in the defrosting operation. This structure allows ventilation of a greater amount during the heating thermostat off operation compared to that during the heating thermostat off operation, which is set to be substantially the same as a ventilation amount during the defrosting operation. Further, the room temperature can approximate a set temperature promptly.

(6) A ventilation amount in the heating thermostat off operation is set to be greater than that in the oil recovering operation. The oil recovering operation is practically the same as a cooling operation. Thus, implementing the oil recovering operation reduces a room temperature. Performing ventilation during the oil recovering operation reduces the room temperature further, thereby increasing a heating load on the air conditioner 1 to be imposed after the oil recovering operation. Meanwhile, the heating thermostat off operation does not reduce the room temperature largely, so that ventilation during the heating thermostat off operation is effective.

As described above, the effect achieved by ventilation during the oil recovering operation differs from the effect achieved by ventilation during the heating thermostat off operation. In this regard, a ventilation amount in the heating thermostat off operation is set to be greater than that in the oil recovering operation. This allows ventilation of a greater amount during the heating thermostat off operation than a ventilation amount during the heating thermostat off operation that is set to be substantially the same as a ventilation amount during the oil recovering operation. Further, the room temperature can approximate a set temperature promptly.

(7) When the air conditioner 1 implements the defrosting operation, the ventilator 2 performs ventilation in the ventilation suppressed mode over a period spanning from the start of the defrosting operation to when the set time ty has elapsed after completion of the defrosting operation. The defrosting operation is practically the same as a cooling operation, so that implementing the defrosting operation reduces a room temperature. Further, performing ventilation in the normal ventilation mode immediately after completion of the defrosting operation reduces the room temperature further, thereby causing the risk of an excessively large heating load to be imposed thereafter on the air conditioner 1. In response, ventilation is performed in the ventilation suppressed mode over a period spanning from a time point after completion of the defrosting operation to when the set time ty has elapsed. This can reduce a heating load to be imposed after the defrosting operation.

This embodiment can be changed as follows.

Figure 7:
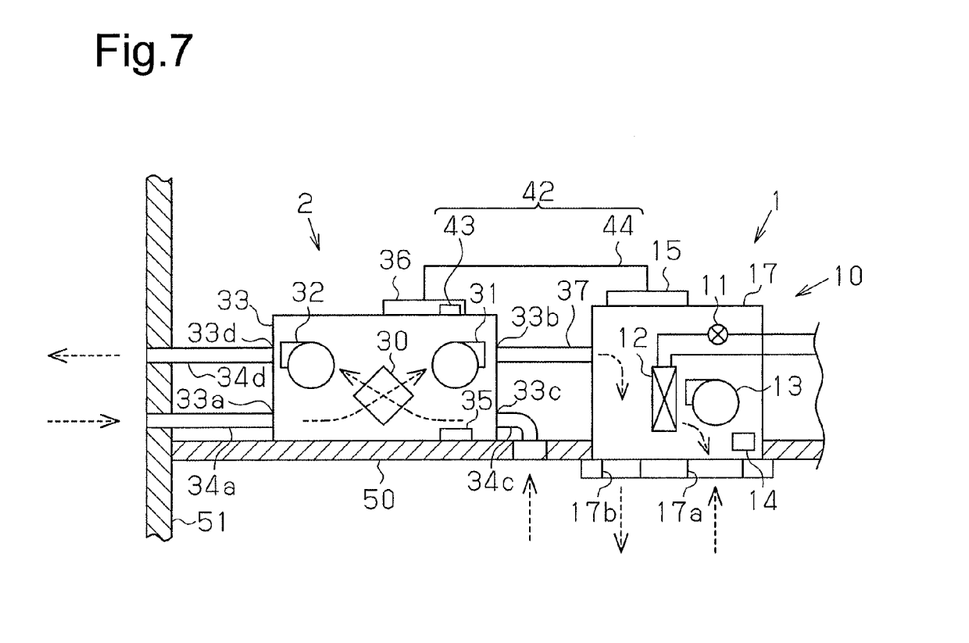
FIG. 7 is a schematic view showing a modification of the air conditioning system.

In the aforementioned embodiment, the "ventilation mode setting process" is implemented in the air conditioning system including the air conditioner 1 and the ventilator 2 set in respective indoor spaces. The "ventilation mode setting process" is applicable not only to an air conditioning system of this structure but also to an air conditioning system including at least the air conditioner 1 and the ventilator 2. The technique of this embodiment is applicable to an air conditioning system shown in FIG. 7, for example. In FIG. 7, components the same as those of the air conditioning system of this embodiment are identified by the same signs. Change from the air conditioner 1 of this embodiment lies in that an outlet for outdoor air fed from the ventilator 2 is the same as that of the air conditioner 1. Specifically, in the illustration of FIG. 7, a supply pipe 37 extending from the ventilator 2 is connected to the housing 17 of the indoor unit 10. According to this structure, air to be supplied from the ventilator 2 to indoor space is blown through the outlet 17b of the indoor unit 10. Applying the technique of this embodiment to this air conditioning system can achieve the aforementioned effects (1) to (7).

In the aforementioned embodiment, the ventilator 2 uses modes at five stages as a setting mode indicating a ventilation amount which includes the H mode, the M mode, the L mode, the LL mode, and the N mode. For further simplification, a ventilation amount may be controlled using a number of modes at four stages or less. Meanwhile, for higher control, a ventilation amount may be controlled using a number of modes at six stages. Alternatively, a ventilation amount may be changed continuously.

In the aforementioned embodiment, the carbon dioxide sensor is provided to the ventilator 2. Alternatively, the carbon dioxide sensor 35 may be provided to the air conditioner 1. This can achieve the aforementioned effect (3).

In the aforementioned embodiment, the ventilator 2 senses a carbon dioxide concentration with the carbon dioxide sensor 35. The carbon dioxide sensor 35 may be replaced by a human body detection sensor capable of detecting the number of persons. Specifically, a carbon dioxide concentration may be assumed based on the number of persons.

The invention claimed is:

1. An air conditioning system comprising an air conditioner that implements at least a heating operation and a ventilator including an exhaust fan to exhaust indoor air, an air supply fan to introduce outdoor air, and a total heat exchanger to exchange heat between the indoor air and the outdoor air, wherein
  during heating operation, the air conditioner implements a temperature controlling operation of controlling a room temperature and at least one type of operation not intended for temperature control that is not to control the room temperature, the operation not intended for temperature control generating a heating load,
  when the air conditioner implements the temperature controlling operation, the ventilator performs ventilation in a normal ventilation mode where a ventilation amount is set at a certain ventilation amount or more,
  when the air conditioner implements the operation not intended for temperature control, the ventilator performs ventilation in a ventilation suppressed mode where the number of rotations of the exhaust fan is made greater than that of the air supply fan to place indoor space in a negative pressure and ventilation is performed at an amount smaller than the certain ventilation amount or ventilation is stopped, and
  in the ventilation suppressed mode, the amount of ventilation by the ventilator is set to be smaller in response to a greater heating load that is increased by ventilation performed during the operation not intended for temperature control.

2. The air conditioning system according to claim 1, wherein, in the ventilation suppressed mode, a period of ventilation in the ventilation suppressed mode to be performed after completion of the operation not intended for temperature control is set to be longer in response to a greater heating load resulting from the ventilation performed after completion of the operation not intended for temperature control.

3. The air conditioning system according to claim 1, wherein
  the ventilator or the air conditioner includes a carbon dioxide sensor, and
  if a carbon dioxide concentration sensed by the carbon dioxide sensor is higher than a set concentration, the ventilator increases the ventilation amount in response to the carbon dioxide concentration regardless of whether the air conditioner is implementing the temperature controlling operation or the operation not intended for temperature control.

4. The air conditioning system according to claim 1, wherein the operation not intended for temperature control includes at least one of the following operations: a preliminary operation to be implemented when the heating operation is started, a heating thermostat off operation of stopping a compressor of the air conditioner if a room temperature becomes higher than an upper limit of a set temperature, a defrosting operation of making a refrigerant circuit of the air conditioner run as a cooling cycle, and an oil recovering operation of recovering a lubricant of the compressor by making the refrigerant circuit of the air conditioner run as a cooling cycle.

5. The air conditioning system according to claim 1, wherein
  the operation not intended for temperature control includes at least a heating thermostat off operation of stopping a compressor of the air conditioner if a room temperature becomes higher than an upper limit of a set temperature and a defrosting operation of making a refrigerant circuit of the air conditioner run as a cooling cycle, and
  a ventilation amount in the heating thermostat off operation is greater than that in the defrosting operation.

6. The air conditioning system according to claim 1, wherein
  the operation not intended for temperature control includes at a least heating thermostat off operation of stopping a compressor of the air conditioner if a room temperature becomes higher than an upper limit of a set temperature, and an oil recovering operation of recovering a lubricant of the compressor by making a refrigerant circuit of the air conditioner run as a cooling cycle, and
  a ventilation amount in the heating thermostat off operation is greater than that in the oil recovering operation.

7. The air conditioning system according to claim 1, wherein
  the operation not intended for temperature control includes at least a defrosting operation of making a refrigerant circuit of the air conditioner run as a cooling cycle, and
  when the air conditioner implements the defrosting operation, the ventilator performs ventilation in the ventilation suppressed mode over a period spanning from the start of the defrosting operation to when a set time has elapsed after completion of the defrosting operation.

* * * * *